(12) United States Patent
Uemura

(10) Patent No.: US 11,556,283 B2
(45) Date of Patent: Jan. 17, 2023

(54) IMAGE FORMING APPARATUS CHANGING A DISPLAY STATE OF A SOFTWARE KEY ON A DISPLAY WHEN A CORRESPONDING HARDWARE KEY IS PRESSED

(71) Applicant: CANON KABUSHIKI KAISHA, Tokyo (JP)

(72) Inventor: Takuya Uemura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/389,224

(22) Filed: Jul. 29, 2021

(65) Prior Publication Data
US 2021/0357161 A1 Nov. 18, 2021

Related U.S. Application Data

(63) Continuation of application No. PCT/JP2020/005009, filed on Feb. 4, 2020.

(30) Foreign Application Priority Data

Feb. 5, 2019 (JP) .............................. JP2019-018765

(51) Int. Cl.
*G06F 3/12* (2006.01)

(52) U.S. Cl.
CPC .......... *G06F 3/1205* (2013.01); *G06F 3/1253* (2013.01); *G06F 3/1284* (2013.01)

(58) Field of Classification Search
CPC .... G06F 3/1205; G06F 3/1253; G06F 3/1284; G06F 3/0227; H04N 1/0049; H04N 1/00493
See application file for complete search history.

(56) References Cited

U.S. PATENT DOCUMENTS

| 8,648,820 B2 * | 2/2014 | Sensu .................. G06F 3/0227 358/1.14 |
| 9,686,429 B2 | 6/2017 | Tachibana et al. |

(Continued)

FOREIGN PATENT DOCUMENTS

| JP | 2006146330 A | * 6/2006 |
| JP | 2007-172385 A | 7/2007 |

(Continued)

OTHER PUBLICATIONS

International Search Report dated Mar. 24, 2020 in corresponding PCT Application No. PCT/JP2020/005009 (English translation included).

*Primary Examiner* — Benjamin O Dulaney
(74) *Attorney, Agent, or Firm* — Venable LLP

(57) ABSTRACT

An image forming apparatus includes an apparatus main assembly including a panel surface 57 capable of inputting information by displaying a software numerical key portion 58 and a numerical key portion 206 comprised of a plurality of hardware keys, and is provided with a general-purpose numerical key unit 200 capable of inputting information to the apparatus main assembly. The panel surface 57 includes a plurality of software keys corresponding to the numerical key portion 206, and in a case that a "1" key 206a of the numerical key portion 206 is in an ON state, the ON state of the "1" key 206a is displayed by using a "1" key 58a corresponding to the "1" key 206a.

15 Claims, 8 Drawing Sheets

(56) References Cited

U.S. PATENT DOCUMENTS

| | | | |
|---|---|---|---|
| 10,079,946 B2 | 9/2018 | Tachibana et al. | |
| 10,582,072 B2 | 3/2020 | Tachibana et al. | |
| 2017/0097719 A1* | 4/2017 | Kohara | G06F 3/14 |

FOREIGN PATENT DOCUMENTS

| | | | |
|---|---|---|---|
| JP | 2007172385 A | * | 7/2007 |
| JP | 2011-118584 | | 6/2011 |
| JP | 2014-22927 A | | 2/2014 |
| JP | 2016-48365 A | | 4/2016 |
| JP | 2018-84974 A | | 5/2018 |

\* cited by examiner

IMAGE FORMING APPARATUS CHANGING A DISPLAY STATE OF A SOFTWARE KEY ON A DISPLAY WHEN A CORRESPONDING HARDWARE KEY IS PRESSED

This application is a continuation of International Patent Application No. PCT/JP2020/005009, filed Feb. 4, 2020, which claims the benefit of Japanese Patent Application No. 2019-018765, filed Feb. 5, 2019, the contents of each of which is incorporated by reference herein.

TECHNICAL FIELD

The present invention relates to an image forming apparatus to which an input device including a hardware key and to be externally connectable.

BACKGROUND ART

Conventionally, for example, an image forming apparatus of an electrophotographic type has been widely used as a copying machine, a printer, a facsimile (machine), a multi-function machine having a plurality of functions of these (machines), and the like. In such an image forming apparatus, in order to permit a user to perform input of numerical values such as the number of image-formed sheets and a facsimile number or input of processing such as a start, a stop, or the like of image forming processing, for example, an operating portion (display portion) capable of displaying and inputting information on a front side upper portion of an apparatus main assembly is provided. As such an operating portion, for example, one provided with a touch panel where input keys (software keys) are displayed on a display screen and with hardware keys such as numerical keys, a start key, and a stop key has become widespread. The hardware keys are, for example, disposed adjacent to the touch panel.

In the image forming apparatus provided with an operating portion, when the number of sheets subjected to copying and a designation number (telephone number/FAX number) of facsimile are inputted, for example, a numerical key portion as software keys including numerical values from 0 to 9 is displayed on a touch panel. A user performs a touch operation at a numerical key portion of the touch panel, so that the user is capable of performing input of setting of the number of sheets subjected to copying and input of the designation number to the image forming apparatus. When a numeric displayed on the touch panel is touch-operated by the user, a controller acquires coordinate data, of a touched portion by the user, from the touch panel, and converts the coordinate data into numerical (value) information, and then executes a predetermined operation depending thereon.

However, when the input is carried out on the touch panel for receiving the numerical value input by the touch operation, the user cannot feel a physical sense of pushing-down. For this reason, the user performs an input operation while the user confirms the input one numeric by one numeric while looking at the display screen of the touch panel, so that improvement in operating property has been desired. In order to solve this, an image forming apparatus to which an input device (for example, a numerical key unit or a full-key board unit) including a numerical key portion comprised of physical hardware keys is externally connectable has been developed (Japanese Laid-Open Patent Application (JP-A) 2011-118584). To the image forming apparatus, the user externally connects the input device and pushed down a hardware key which is a numerical key of the input device, whereby a predetermined key code is outputted, so that input of the number of sheets subjected to copying and the designation number of the facsimile and the like is

Problem to be Solved by the Invention

However, in the image forming apparatus described in the above-described JP-A 2011-118584, even when the user operates the key of the externally connected input device, whether or not the numerical value is inputted to the image forming apparatus as intended cannot be discriminated immediately. For example, in the case where the user operates the numerical key, the pushed numerical value is displayed at a predetermined display position of the touch panel, so that the user may only be required to check the matter, but when the user thus his(her) eyes to a display position apart from the input device, input efficiency is poor and an operating property lowers. Further, in this case, for example, even in the case where the user feels anxiety that the numerical value is not inputted because the user pushes the key lightly and where the user feels anxiety that the user fails to push the key and thus the numerical value is erroneously inputted twice, the user takes time for check and cannot discriminate immediately. For that reason, the user has to perform a key input operation while checking whether or not the numerical value is inputted as intended through a key operation of the input device by turning his(her) eyes to the display portion, so that input efficiency is poor and thus it has been desired to improve the operating property.

It is an object of the present invention is to provide an image forming apparatus capable of improving an operating property when numerical value input is made from the input device in the case where the input device for external attachment is connected to the image forming apparatus.

Means for Solving the Problem

The image forming apparatus of the present invention comprises: an image reading device for reading an image of an original; an image forming portion for forming the image on a recording medium on the basis of a result of the image reading device; an operating panel including a display screen capable of displaying a plurality of software numerical keys, as software keys, for inputting numerical information of 0 to 9, respectively; an input device including a plurality of hardware numerical keys, as hardware keys capable of being inputted by being pushed down, for inputting numerical information of 0 to 9, respectively; and a controller for controlling the display screen so as to change a display state of the plurality of software numerical keys, wherein the controller controls the display screen so that a display state of the software numerical key corresponding to a numerical value identical to a numerical key pushed down in response to pushing-down of the plurality of hardware numerical keys of the input device is changed and so that the changed display state of the software numerical value is returned to a display state before the pushing-down of the hardware numerical key in response to release of the pushing-down of the hardware numerical key.

Effect of the Invention

According to the present invention, it is possible to improve the operating property when the numerical value input is made from the input device in the case where the input device for external attachment is connected to the image forming apparatus.

EMBODIMENTS FOR CARRYING OUT THE INVENTION

In the following, a first embodiment of the present invention will be specifically described with reference to FIGS. 1 to 6. Incidentally, in this embodiment, as shown in each of the figures, toward an image forming apparatus 1, a front side is represented by a front side F, a rear side (rear) is represented by a back side B, a left(-hand) side is represented by L, a right(-hand) side is represented by R, an upper (upward) side is represented by U, and a lower (downward) side is represented by D.

In this embodiment, as an example of the image forming apparatus 1, a full-color printer of a tandem type is described. However, the present invention is not limited to one mounted on the image forming apparatus 1 of the tandem type but may also be one mounted on an image forming apparatus of another type, and further, the present invention is not limited to one for a full-color image, but may also be one for a monochromatic image or for a mono-color (single color) image. Or, the present invention can be carried out in various uses, such as printers, various printing machines, copying machines, facsimile machines and multi-function machines.

<Image Forming Apparatus>

Figure 1:
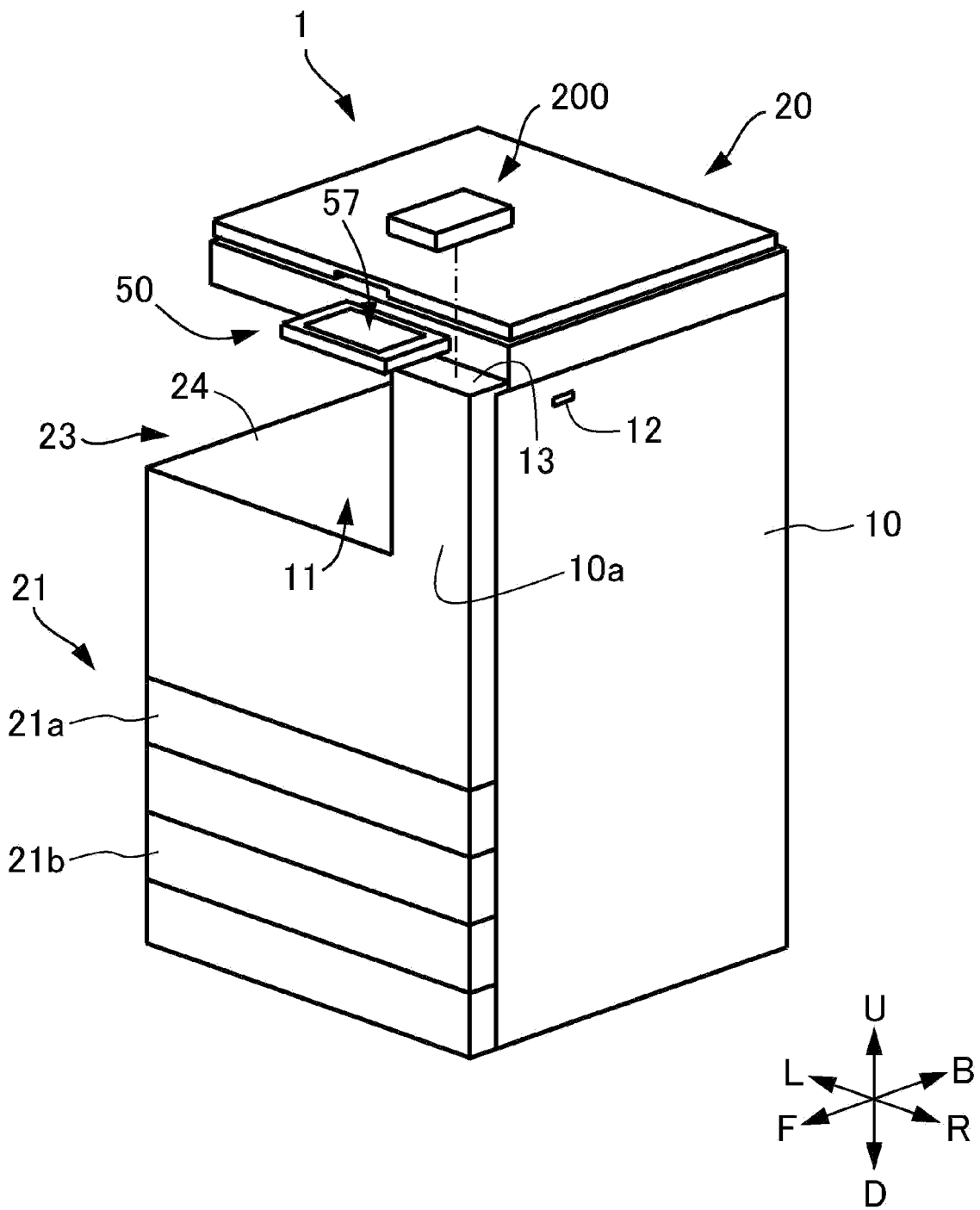
FIG. 1 is a perspective view showing a schematic structure of an image forming apparatus according to an embodiment.

As shown in FIG. 1, the image forming apparatus of this embodiment includes an image forming apparatus main assembly (hereinafter, referred to as an apparatus main assembly) 10. The apparatus main assembly 10 includes an image reading portion 20, a sheet feeding portion 21, an image forming portion 22 (see FIG. 2), a sheet discharging portion 23, a controller 30 (see FIG. 2) and an operating portion 50. Incidentally, on the sheet as a recording material, a toner image is to be formed, and specific examples of the sheet may include plain paper, a resin-made material sheet as a substitute for the plain paper, thick paper, a sheet for an overhead projector, and the like.

The image reading portion 20 is, for example, a flat head scanner device, and is provided at an upper portion of the apparatus main assembly 10. The image reading portion 20 includes an unshown platen glass as an original mounting table, an unshown light source for irradiating an original, placed on the platen glass, with light, and an unshown image sensor for converting reflected light into a digital signal, and the like member. The sheet feeding portion 21 is disposed at a lower portion of the apparatus main assembly 10, and includes sheet cassettes 21a and 21b for stacking and accommodating the sheet such as recording paper, and feeds the sheet to the image forming portion 22 (see FIG. 2). The sheet cassettes 21a and 21b are capable of accommodating the sheets for image formation in the image forming portion 22.

The image forming portion 22 is provided inside the apparatus main assembly 10 and includes image forming units each including an unshown developing device and an unshown photosensitive drum as an image bearing member, toner bottles, an intermediary transfer unit, a secondary transfer portion, a fixing device, and the like. The image forming portion 22 is capable of forming an image onto the sheet fed from the sheet feeding portion 21, on the basis of image information from a controller 30. The sheet discharging portion 23 includes a discharging tray 24 provided on a side downstream of an unshown discharge opening formed in the apparatus main assembly 10. The discharging tray 24 is a face-down tray, and the sheet discharged through the discharge opening is stacked on the discharge tray 24. Further, a space between the image reading portion 20 and the discharge tray 24 constitutes an in-body space portion 11.

<Controller>

Figure 2:
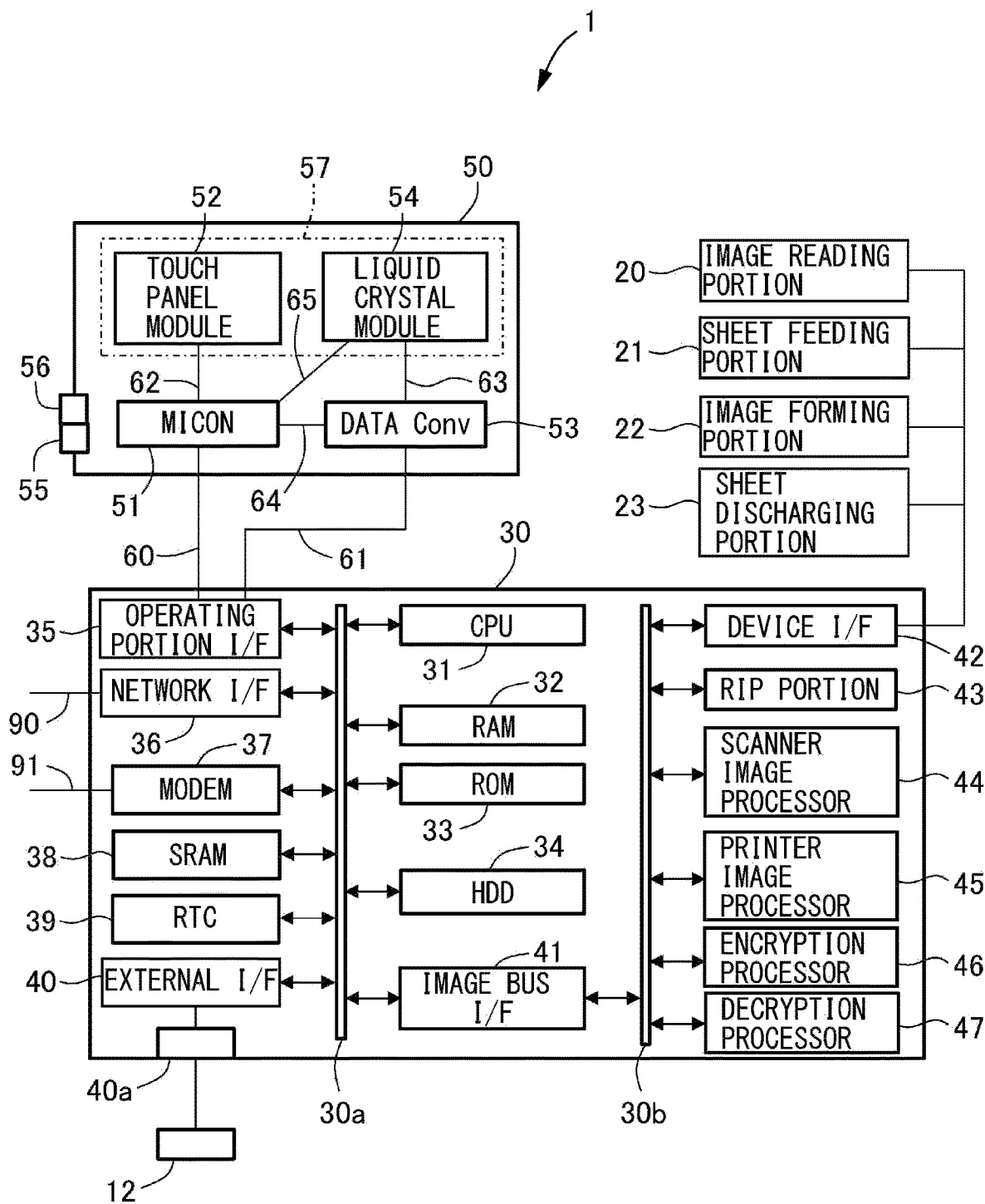
FIG. 2 is a control black diagram of the image forming apparatus according to the embodiment.

As shown in FIG. 2, the controller 30 is constituted by a computer, and for example, includes a CPU 31, a RAM 32 for temporarily storing data, a ROM 33 for storing a program for controlling respective portions, and an HDD 34. In this embodiment, the controller 30 includes a system bus 30a and an image bus 30b, and each of the CPU 31, the RAM 32, the ROM 33, and the HDD 34 is connected to the system bus 30a. The CPU 31 is a processor for carrying out integrated control of an entirety of the image forming apparatus 1 and is a main body of a system controller. The CPU 31 carries out, for example, image processing of image data for image formation and carries out network control, and in addition, controls image forming processing by not only outputting an instruction of image formation to the image forming portion 22 but also transmitting and receiving information between itself and the operating portion 50.

The RAM 32 is a system work memory for operating the CPU 31 and is also an image memory for temporarily storing the image data, and functions as a main memory, a work area, and the like of the CPU 31. In the RAM 32, setting information in the image forming apparatus 1, and a job log and an operation log when respective processes are performed are stored. In the ROM 33, an image formation control sequence or the like for forming an image on a sheet is stored. In this embodiment, the ROM 33 is, for example, a boot ROM and stores a boot program of a system. The HDD 34 is a hard disk drive and stores a system software, an application, the image data, and the like.

The controller 30 includes an operating portion input/output circuit (I/F) 35, a network input/output circuit (I/F) 36, a modem 37, an SRAM 38, an RTC 39, and an external input/output circuit (I/F) 40, which are each connected to the system bus 30b. The operating portion input/output circuit (I/F) 35 not only carries out transmission of the image data to an operating portion 50 described later and various communications from the operating portion 50 but also inputs, to the CPU 31, information inputted from the operating portion 50 by a user.

The network input/output circuit 36 is connected to a network 90 and carries out input/output of the information. Further, the modem 37 is connected to a public line (network) 91 and functions as a facsimile communication portion capable of transmitting and receiving data via a telephone line, and carries out input/output of the information. By this, the controller 30 is capable of communicating with another PC and server, connected thereto, via the network 90 by the network input/output circuit 36 or via the public line 91 by the modem 37 under instruction of the CPU 31. That is, the image forming apparatus 1 is connected to the network 90 or the public line 91, and carries out input/output of image information and device information.

The SRAM 38 is a nonvolatile storing medium capable of high-speed operation. The RTC 39 is a real time clock, and performs processing in which a current time is continuously counted even in a state in which power is not supplied to the controller 30. The external input/output circuit 40 is a general-purpose input/output circuit such as USB and connects a general-purpose PC, a memory device, and a general-purpose numerical key unit 200 or a dedicated numerical key unit 70 which is described later via a USB connector 40a of a USB standard and a USB port (main assembly-side connecting portion) 12. Incidentally, the USB is an abbreviation of a Universal Serial Bus. The USB port 12 is, for example, a connector installed on a side surface or a front surface of an installation surface 13 (see FIG. 1), described later, where the general-purpose numerical key unit 200 or the dedicated numerical key unit 70 is installed, or on a side surface of the operating portion 50. To the USB port 12, the general-purpose numerical key unit 200 or the dedicated numerical key unit 70 is connectable.

The controller 30 includes an image bus input/output circuit (I/F) 41. The image bus input/output (I/F) 41 is a bus bridge which connects the system bus 30a and the image bus 30b transferring the image data at high speed and which converts a data structure. The image bus 30b is constituted by, for example, a PCI bus or an IEEE 1394.

The controller 30 includes a device input/output circuit (I/F) 42, a RIP portion 43, a scanner image processing portion 44, an printer image processing portion 45, an encryption processing portion 46, and a decryption processing portion 47, which are each connected to the image bus 30b. The device input/output circuit 42 connects the image reading portion 20 and the image forming portion 22 to the controller 30 and performs a synchronous line and a non-synchronous line of the image data. The RIP portion 43 is a raster image processor and develops PDL data into a bit-mapped image. The scanner image processing portion 44 performs correction, processing and editing of the image data. The printer image processing portion 45 subjects print output image data to printer correction, resolution conversion, and the like. The encryption processing portion 46 subjects input data including the image data to encryption processing. The description processing portion 47 subjects encrypted data to description processing.

<Operating Portion>

Next, an example of a hardware constitution for controlling respective pieces of software of the operating portion (panel portion) 50 will be described. The operating portion 50 includes a micon 51, a touch panel module 52, a data converter (Conv) 53, and a liquid crystal module 54. The operating portion 50 is connected to the controller 30 by a serial bus 60 for establishing communication with the CPU 31 and by a bus 61 for transferring data for being displayed on the liquid crystal module 54.

The micon 51 is a microcomputer for carrying out integrated control of entirety of the operating portion 50. Inside the micon 51, a ROM in which a program for operating the micon 51 is stored is mounted. The touch panel module 52 is disposed on a surface of the liquid crystal module 54, and by user's touch, the touch panel module 52 notifies the micon 51 of positional information of a touched portion via a touch panel communication bus 62. The operating portion 50 is capable of causing the liquid crystal module 54 to display a software numerical key portion 58 (see FIG. 3) described later and the user is capable of inputting information by contact with the touch panel module 52 via the software numerical key portion 58. The touch panel module 52 is constituted by a touch panel device and a touch panel device controller. As a touch panel device, those of any types such as a resistive film type, an electrostatic capacity type, and an optical type of infrared radiation or the like may also be applied.

The data converter 53 is a module which receives the image data from the operating portion IN/output circuit 35 of the controller 30 via the bus 61 and which then converts the image data into data format which is capable of being received by the liquid crystal module 54. For example, from the controller 30, the data converter 53 receives data of standards such as Display Port and HDMI (registered trademark) and converts the data into LVDS and signal format of a CMOS level which are capable of being received by the liquid crystal module 54, and then inputs the converted data to the liquid crystal module 54 via a bus 63. Further, the data converter 53 is connected to the micon 51 by a bus 64, and also has a function of overwriting the image data sent from the controller 30 with the image data generated by the micon 51 at a predetermined position.

The liquid crystal module 54 is a module constituted by an LCD and a backlight module, and receives data from the data converter 53 via the bus 63 and then transfers the image data to the LCD at a timing determined in advance. At this time, by causing the backlight module to emit light, the image data transferred to the LCD is displayed as a visible image. Adjustment of brightness of the back light is performed by operating switches 55 and 56 dedicated for brightness adjustment accompanying the operating portion 50.

As shown in FIG. 1, the operating portion 50 is provided on a front side F than a central portion of the image forming apparatus 1 with respect to a front-rear direction and is provided at an upper portion of a front cover 10a which is a part of an outer casing cover of the apparatus main assembly 10. The operating portion 50 is formed in, for example, a rectangular flat plate shape, and is fixedly provided to the apparatus main assembly 10 with a panel surface 57, toward an upper side U, constituted by laminating the touch panel module 52 on the liquid crystal module 54 (see FIG. 2). Incidentally, the shape of the operating portion 50 is not limited to the rectangular flat plate shape, but may also be another shape. Further, a direction of the panel surface 57 is not limited to the upper side U, but may also be another direction, and for example, these modules may also be provided so as to be tiltable in an up-down direction relative to the apparatus main assembly 10 and so that the direction of the touch panel module 52 and the liquid crystal module 54 is changeable.

On the right side R of the operating portion 50, the installation surface 13 facing toward the upper side U on the right side of the front side F of the apparatus main assembly 10 adjacent to the operating portion 50 is provided. On the installation surface 13, the general-purpose numerical key unit 200 or the dedicated numerical key unit 70 or the like is capable of being installed, and by installation, the general-purpose numerical key unit 200 or the dedicated numerical key unit 70 is disposed adjacent to the right side R of the operating portion 50 as viewed from the front side. In an outer casing of the apparatus main assembly 10, the USB port 12 is provided on the side surface of the right surface R of the installation surface 13. The user is capable of carrying out USB connection to the USB port 12 by mounting external equipment having a USB terminal, such as the general-purpose numerical key unit 200 or the dedicated numerical key unit 70, an IC card reader, a USB memory, and the like.

Figure 3:
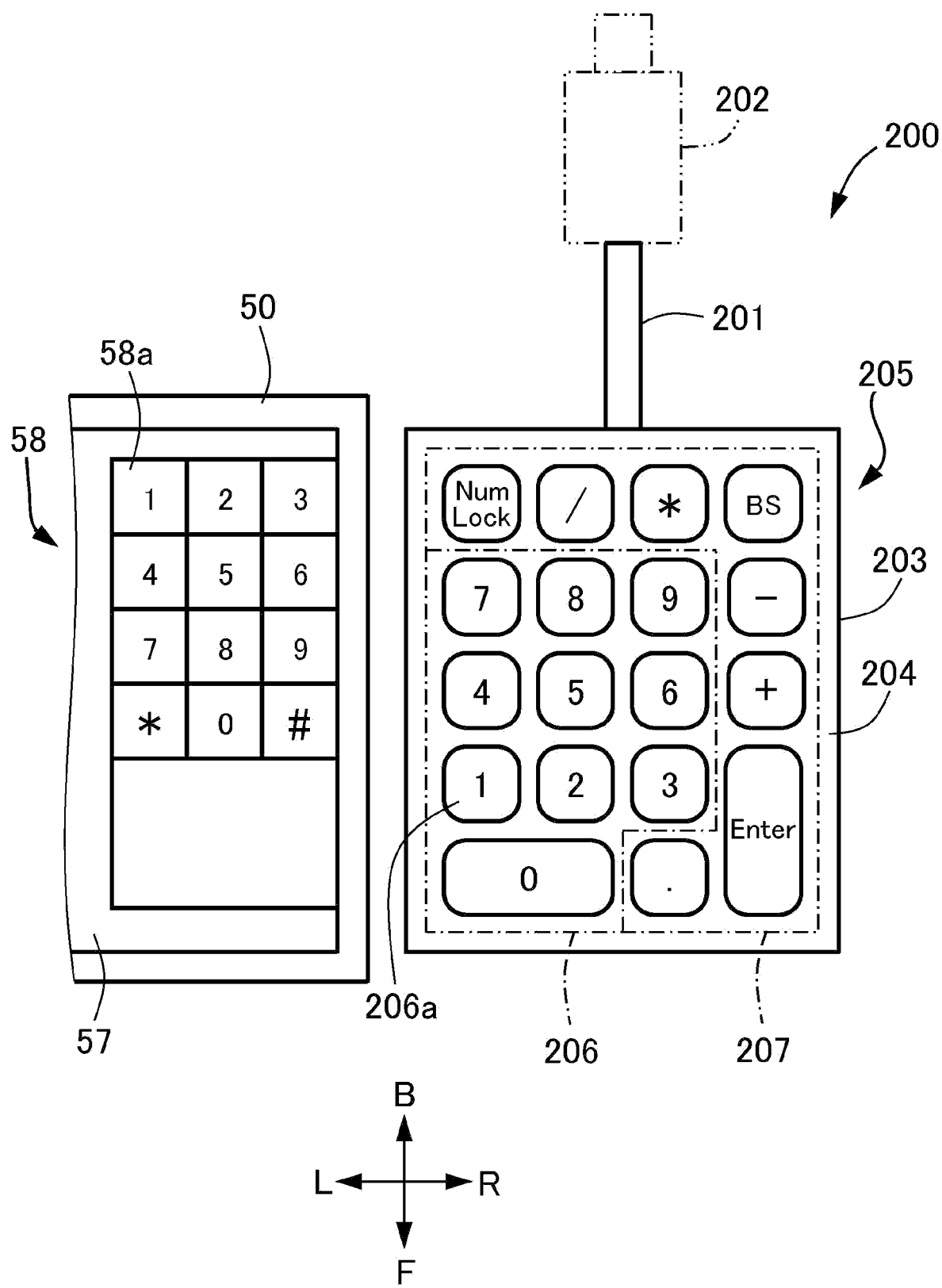
FIG. 3 is a (top) plan view showing an unoperated general-purpose numerical key unit and a part of an operating portion in the image forming apparatus according to the embodiment.

As shown in FIG. 3, for example, on the right side R of the panel surface 57, the software numerical key portion (software keys) 58 is capable of being displayed. The software numerical key portion 58 is input keys which display numerical values of 0 to 9 and which detect input of the keys by subjecting a display portion of each of the numerical values to touch operation.

<General-Purpose Numerical Key (Ten Key) Unit>

Next, a hardware constitution and an operation of the general-purpose numerical key unit 200 which is a general-purpose input device connected to the image forming apparatus 1 will be described. As shown in FIG. 3, the general-purpose numerical key unit 200 includes a connecting cable (connecting portion) 201 comprised of a USB cable and a USB connector 202, and is connectable to a general PC, and in addition, to the image forming apparatus 1 of this embodiment. The general-purpose numerical key unit 200 not only includes at least one hardware key, but also for example, the general-purpose numerical key unit 200 is mounted to the image forming apparatus 1 including the operating portion 50 capable of inputting information, and is capable of inputting information to the image forming apparatus 1 separately from the operating portion 50. As an example of different uses for different purposes in information input between the operating portion 50 and the general-purpose numerical key unit 200, setting of a density, a size, and the like relating to image formation is inputted from the operating portion 50, and numerical values such as the number of sheets subjected to the image formation and a designation number of a facsimile are inputted from the general-purpose numerical key unit 200. Incidentally, in the present specification, the numerical key is a concept including either of the case where the numerical key shows 10 numerical keys from 0 to 9, the case where the numerical key shows 12 keys in which "*" and "#" are added to the (10) numerical keys, and the case where the numerical key shows about 20 keys in which numerical keys include four arithmetic operators, a "NumLock", and the like.

The general-purpose numerical key unit 200 includes, for example, a casing 203, an upper cover 204 provided on an upper surface of the casing 203, and operation keys (plurality of numerical keys) 205 provided on the upper cover 204. The operation keys 205 roughly include a numerical key portion (numerical value key portion) 206 and a functional key portion 207. The numerical key portion 206 includes at least a plurality of numerical keys capable of inputting information on numerical values of "0" to "9" by being pushed down and can be utilized in the case where numerical (value) input is needed, such as designation of the number of sheets subjected to printing during the printing, setting of a margin length, and the like. The functional key portion 207 includes a plurality of numerical keys capable of input by being pushed down. A "BS" key of the functional key portion 207 is capable of deleting the last inputted numerical value. "NumLock", "I", "−", "+", "Enter", and "." of the function key portion 207 are keys with no use occasion as a function of the image forming apparatus 1.

Here, the general-purpose numerical key unit 200 of this embodiment is designed for the purpose of being principally connected to a desktop PC, a note PC, or the like. That is, uses of the general-purpose numerical key unit 200 are principally electronic calculator input and numerical value input, and the general-purpose numerical key unit 200 is not designed for the purpose of inputting a facsimile designation number by being connected to the image forming apparatus 1. For that reason, a key arrangement of the general-purpose numerical key unit 200 is similar to a key arrangement of the electronic calculator. That is, the key arrangement of the general-purpose numerical key unit is similar to a key arrangement defined in an ISO (International Standards Organization). That is, as shown in FIG. 3, in the numerical key portion 206, numerical keys from 0 to 9 are adjacently disposed so that 7 to 9 are on a backmost side B, 4 to 6 are on a front side F thereof, and 1 to 3 are on a front side F thereof. Further, on the front side F of the numerical keys of 1 and 2, the numerical key of 0 is disposed. That is, the numerical keys of 1 to 9 are aligned and arranged in a matrix of 3×3 in the case where the numerical key unit 70 is viewed from the front side, so that from an upper stage in a column direction, the numerical keys of 7 to 9, the numerical keys of 4 to 6, and the numerical keys of 1 to 3 are sequentially disposed and so that the numerical key of 0 is disposed on a further lower stage than the row of the numerical keys of 1 to 3.

In other words, with respect to the 10 hardware keys from 0 to 9, a row of the numerical keys of 7, 8 and 9 is disposed on the rearmost side, and a row of the numerical keys of 4, 5 and 6 is disposed on a side in front of the row of 7, 8 and 9. Further, a row of the numerical keys of 1, 2 and 3 is disposed on a side in front of the row of the numerical keys 4, 5 and 6. Further, the hardware key of 0 is disposed on a side in front of the row of the hardware keys of 1, 2 and 3. Further, when these numerical keys from 0 to 9 are viewed in column, from a left(-hand) side, these numerical keys are arranged in the order of a column of the numerical keys 1, 4 and 7, a column of the hardware keys 2, 5 and 8, and a column of the numerical keys 3, 6 and 9. The hardware key of 0 is disposed so as to bridge over the column of the hardware keys of 1, 4 and 7 and the column of the hardware keys of 2, 5 and 8. Further, on the right side R and the back side B of the numerical key portion 206, the functional key portion 207 is disposed. Incidentally, the general-purpose numerical key unit 200 may also be one provided with a numerical key of 00 in addition to the numerical key of 0. Further, the numerical key of 0 may also be disposed so as to be included in the column of the hardware keys of 2, 5 and 8 or the column of the hardware keys 3, 6 and 9. Thus, the general-purpose numerical key unit 200 is not designed for the purpose of inputting the facsimile designation number, and therefore, is different in key arrangement from the dedicated numerical key unit 70 described later.

As regards the general-purpose numerical key unit 200, as shown in FIG. 1, the casing 203 is adjacent to the right side R of the operating portion 50 of the image forming apparatus 1 and is mounted, for example, by screwing or bonding, on the installation surface 13 facing the upper side U on a right side R of the front side R of the apparatus main assembly 10.

By this, the user can easily use the general-purpose numerical key unit 200 by utilizing a right hand while looking at the operating portion 50.

Figure 4:
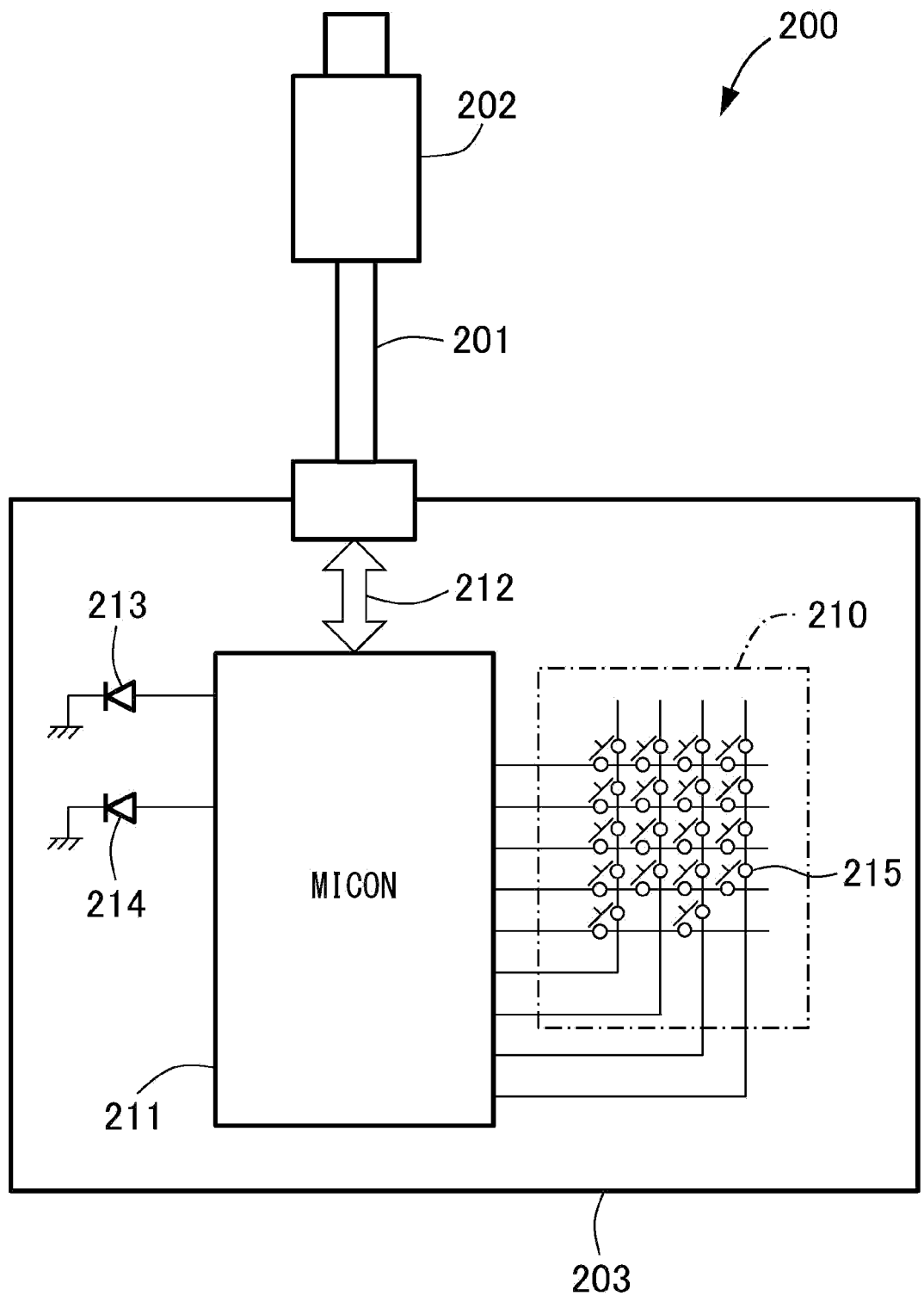
FIG. 4 is a control block diagram of the general-purpose numerical key unit of the image forming apparatus according to the embodiment.

As shown in FIG. 4, the general-purpose numerical key unit 200 includes a hardware key unit 210, a micon 211, an inner bus 212, a connecting cable 201 a USB connector 202, and LEDs 213 and 214. In this embodiment, for example, the inner bus 212 is a USB bus, the connecting cable 201 is a USB cable provided from the casing 203 to an outside, and the USB connector 202 is a USB terminal provided at a tip of the connecting cable 201. By this, the image forming apparatus 1 and the general-purpose numerical key unit 200 are electrically connected to each other via the connecting cable 201.

The hardware key unit 210 includes a plurality of hardware keys. In this embodiment, in order to provide operation feeding (for example, click feeling) of an operation key 205 (see FIG. 3) to the user, as an example of the numerical keys, tactile switches 215 are supplied. The tactile switches 215 are disposed one by one at positions opposing the operation keys 205, respectively, on an inside of the casing 203. The tactile switch 215 is constituted by, for example, a protective cover, a plunger pushed by the operation key 205, a reversing spring not only creating the click feeling but also functioning as a movable contact, and a base portion including two contacts. Incidentally, as the tactile switch 215, an existing or new appropriate constitution can be applied, and thus will be omitted from detailed description.

The micon 211 is capable of executing, for example, input detection from the hardware key unit 210 and turning-on (lighting) control of the NumLock LEDs 213 and 214, and USB communication with the CPU 31 of the image forming apparatus 1 via the external input/output circuit 40 (see FIG. 2). The USB connector 202 is connected to the external input/output circuit 40 via the USB port 12 provided on the side surface of the apparatus main assembly 10 and the USB connector 40a (see FIG. 2). By this, the micon 211 and the controller 30 are USB-connected to each other via the connecting cable 201, and are capable of communicating with each other through an HID protocol for USB.

In the case where the tactile switch 215 is pushed down by the user, the micon 211 specified to tactile switch 215 pushed down, and generates a code determined in advance in the case where the tactile switch 215 is pushed down by the user. The micon 211 sends the generated key code to the CPU 31 of the image forming apparatus 1 via the inner bus 212 and the connecting cable 201. The CPU 31 performs processing depending on the inputted key. Further, in the case where the micon 211 recognized that the "NumLock" key (see FIG. 3) is pushed down and is in the ON state, the micon 211 turns on the LED 213, and in the case where the micon 211 recognized that the "NumLock" key is in the OFF state, the micon 211 turns off the LED 213. By this, the LED 213 is capable of showing the ON/OFF state of the "NumLock" (key) to the operator.

<Operating Portion and Numerical Key Unit>

Here, as shown in FIG. 3, even when the user operates the numerical key portion 206 of the externally attached general-purpose numerical key unit 200, there is no input display portion on the numerical key portion 206, and therefore, whether or not the numerical value is actually inputted is unclear to the user even when the user looks at the numerical key portion 206. Further, on the panel surface 57, the inputted numerical value or the like is displayed on the left side L of the software numerical key portion 58 in some cases. However, it is complicated that the user who inputs the numerical value while looking at the numerical key portion 206 turns his (her) eyes to the left side L of the software numerical key portion 58, so that input efficiency lowers. Therefore, in this embodiment, even in such a case, in order that the operating property of the key input can be improved, on the software numerical key portion 58 of the panel surface 57, a display color of the software numerical key portion 58 corresponding to the operated numerical key portion 206 is provided (inverted) (see FIG. 5). By this, the user is easily capable of recognizing the display color.

<Operation During Numerical Key Unit Operation>

Figure 5:
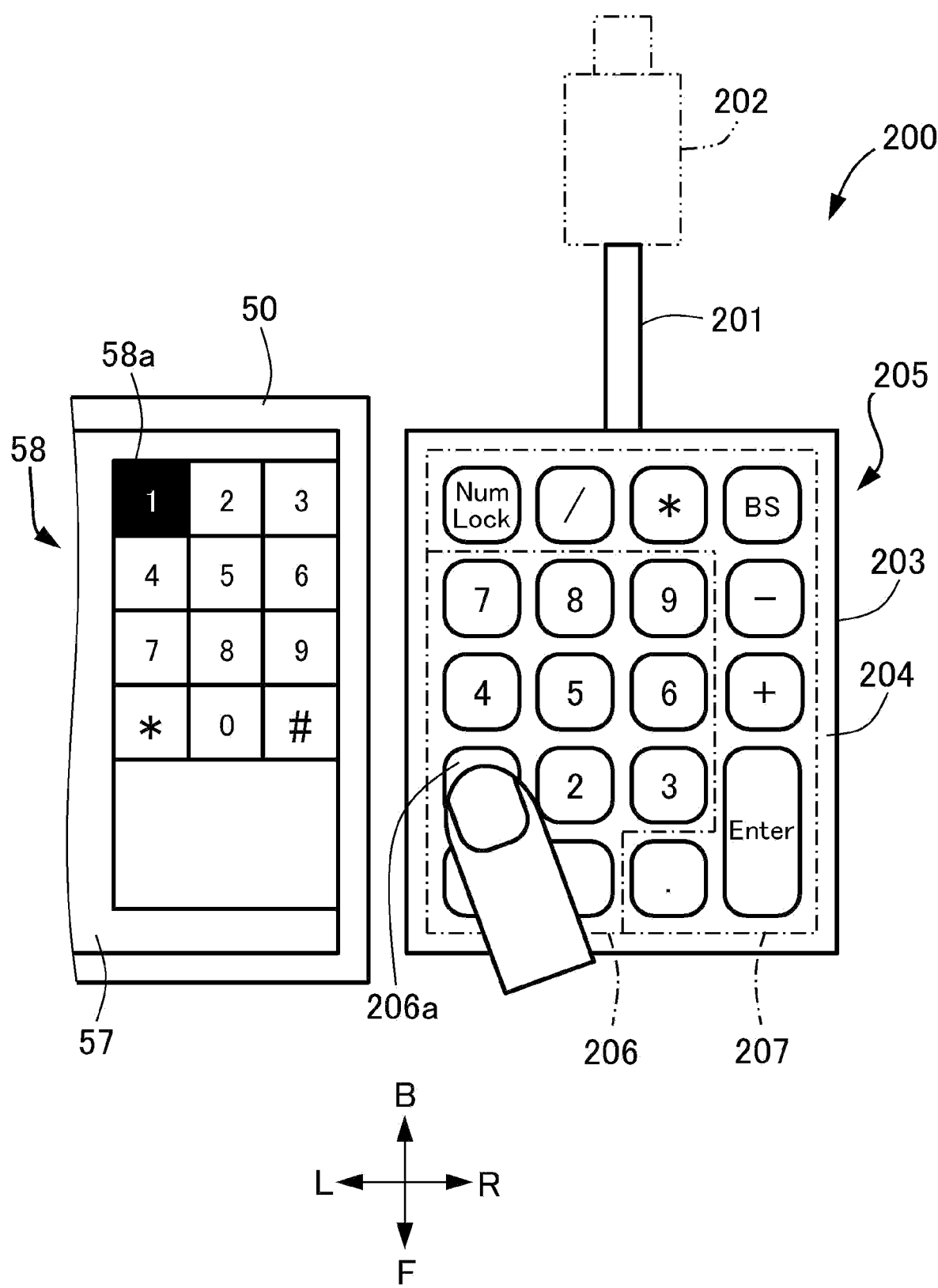
FIG. 5 is a plan view showing the general-purpose numerical key unit during operation and the part of the operating portion in the image forming apparatus according to the embodiment.

In the following, an operation when the general-purpose numerical key unit 200 connected to the image forming apparatus 1 of this embodiment is operated will be specifically described using FIG. 5. In this embodiment, the general-purpose numerical key unit 200 is applied, but the dedicated numerical key unit 70 described later may also be applied. Further, it is assumed that the controller 30 includes a plurality of input modes in which information is capable of being inputted by the general-purpose numerical key unit 200. As shown in FIG. 5, in a state in which the software numerical key portion 58 is displayed on the panel surface 57 of the operating portion 50, for example, in a print number input mode, either of keys of the numerical key portion 206 is capable of being inputted. Further, in this embodiment, as an example, the case where a "1" key 206a of the numerical key portion 206 is pushed down will be described, but similar control is carried out even for another key of the numerical key portion 206.

The controller 30 causes the panel surface 57 to display a key arrangement of the software numerical key portion 58 by making reference to image information of the key arrangement recorded in the RAM 32 or the like. In this embodiment, the software numerical key portion 58 is of a telephone type in which the "1" key is on the upper side (rear side, and the "9" key is on the lower side (front side). However, the key arrangement is not limited to this, and for example, in conformity to the connected numerical key unit, the key arrangement may also be of an electronic calculator type in which the "1" key is on the lower side (front side) and the "9" key is on the upper side (rear side). The controller 30 detects an operation to a coordinate corresponding to a displayed key via the touch panel module 52, and uses the inputted key as a software key for detecting an input operation by the user.

The software numerical key portion 58 corresponds to the numerical key portion 206 of the general-purpose numerical key unit 200, and for example, the same key code is outputted even when either of the "1" keys of the software numerical key portion 58 and the numerical key portion 206 is pushed down, so that "1" is capable of being inputted to the controller 30. That is, the "1" key 206a which is an example of the hardware keys of the numerical key portion 206 of the operation key 205 of the general-purpose numerical key unit 200 and the "1" key 58a which is an example of the software keys of the software numerical key portion 58 correspond to each other. Incidentally, also, as regards other numerical keys of the numerical key portion 206, similarly, these keys correspond to other software keys of the software numerical key portion 58, respectively. Thus, in this embodiment, the operating portion 50 includes the software numerical key portion 58, as software keys corresponding to the hardware keys, so as to be capable of inputting information identical to information capable of being inputted by the hardware keys of the numerical key portion 206. That is, the numerical key portion 206 and the software numerical key portion 58 have the same function.

Further, the controller 30 is capable of changing display of the software numerical key portion 58 corresponding to the numerical key portion 206 on the panel surface 57 of the operating portion 50. The controller 30 is capable of displaying the ON/OFF state of the "1" key 206a of the numerical key portion 206 at the "1" key 58a of the software numerical key portion 58 on the panel surface 57 of the operating portion 50. That is, the controller 30 is capable of displaying, at the "1" key 58 of the software numerical key portion 58, that the "1" key 206a of the numerical key portion 206 is pushed down, and is capable of displaying, at the "1" key 58a of the software numerical key portion 58, that the pushing-down of the "1" key 206a of the numerical key portion 206 is released (eliminated). Thus, in this embodiment, even in the case where the hardware key of the general-purpose numerical key unit 200 is operated, a display screen of the panel surface 57 is renewed so that the resultant display is identical to display in the case where the software numerical key portion 58 of the panel surface 57 is touch-operated.

Further, the controller 30 is capable of executing the ON/OFF display mode in the case where the general-purpose numerical key unit 200 is connected to the USB port 12. The ON/OFF display mode in this embodiment is a mode in which for example, the ON state of the "1" key 206a is displayed at the "1" key 58a. That is, in the case where the numerical key unit is connected to the USB port, in the ON/OFF display mode, in the case where at least a part of the hardware keys of the numerical key portion 206 is in the ON state, the controller 30 displays that the hardware key is in the ON state, with use of the software key corresponding to the hardware key.

Incidentally, in this embodiment, the constitution in which only the software numerical key portion 58 corresponding to the numerical key portion 206 is displayed on the panel surface 57 was described, but the present invention is not limited to this. For example, a constitution in which an instruction to execute a start of reading of an image of an original by the image reading portion 20, an execution key (start key) for providing an instruction to execute FAX transmission, and an operation key, such as a stop key for stopping an image forming job during execution are displayed on the panel surface 57 may also be employed. Further, a functional key portion other than the software numerical key portion 58 corresponding to the hardware key of the functional key portion 207 may also be displayed on the panel surface 57. Even in such a constitution, in the case where a software key corresponding to a hardware key of the general-purpose numerical key unit 200 is displayed on the panel surface 57, by changing display of the corresponding software key in response to pushing-down of the hardware key, the user is capable of easily recognizing the operated key.

In this embodiment, on the panel surface 57 of the operating portion 50, in the case where the ON/OFF state of the "1" key 206a of the numerical key portion 206 is switched, the controller 30 reverses and displays a character color and a color background of the corresponding "1" key 58a of the software numerical key portion 58. That is, the controller 30 reverses the character color and the background color of the "1" key 58a in the case where the "1" key 206a of the numerical key portion 206 is pushed down, and returns the display of the "1" key 58a to a state (state before the colors are reversed) before pushing-down of the "1" key 206a in the case where the pushing-down of the "1" key 206a is released. By this, switching of the ON/OFF state of the hardware key can be easily made visible by changing the display of the software key. However, the change is not limited to reversal of the character color and the background color of the associated key of the software numerical key portion 58, and for example, at least one of the character color and the background color of the associated key of the software numerical key portion 58 may also be displayed by being changed to the color different from the color before the pushing-down of the hardware key.

Next, a processing procedure of the ON/OFF display mode in the case where the general-purpose numerical key unit 200 is connected to the image forming apparatus 1 will be described along a flowchart shown in FIG. 6. When an operation by the user for the hardware key of the numerical key portion 206 of the general-purpose numerical key unit 200 is detected (step S1), the controller 30 carries out recognition of a key code for discriminating the inputted hardware key (step S2). For comparison with the software numerical key portion 58, the controller 30 acquires a surface screen information by the RAM 32 (step S3), and from the information, the controller 30 acquires information of a software key during display (step S4).

The controller 30 discriminates whether or not the software key having the key code identical to the key code of the hardware key inputted at the numerical key portion 206 is during display (step S5). In the case where the controller 30 discriminated that the software key having the key code identical to the hardware key inputted at the numerical key portion 206 is during display (YES of step S5), the controller 30 discriminates whether or not the corresponding software key is in an inputtable state (step S6).

As a state in which the corresponding software key is not inputtable, for example, a copy start key when is not prepared for copying corresponds (step S6). Further, as described above, the controller 30 includes a plurality of input modes in which information is capable of being inputted by the general-purpose numerical key unit 200. Further, the general-purpose numerical key unit 200 is capable of executing the plurality of input modes for inputting the information by the operation keys 205 in a switching manner. As the input modes in this embodiment, for example, a print number input mode and a cassette selecting mode (predetermined input mode) in which of the plurality of sheet cassettes 21a and 21b, the sheet cassette accommodating the sheet fed to the image forming portion 22 is selected exist.

For example, as the input mode, in the case where the print number input mode is executed, either of keys of the numerical key portion 206 of the general-purpose numerical key unit 200 corresponding to the software numerical key portion 58 is capable of being inputted to the panel surface 57. Further, as the input mode, in the case where an input mode for inputting a numerical value restricted to the same manner as the sheet cassettes 21a and 21b as in, for example, the cassette selecting mode is executed, the operation is as follows. In this case, of the software numerical key portion 58, only a numerical key having possibility of being inputted is displayed on the panel surface 57. Numerical keys 3 to 9 for inputting the numbers exceeding the number (2) of the sheet cassettes 21a and 21b are not used in the cassette selecting mode, and therefore, are displayed in a light color or are not displayed. Further, as regards the numerical key portion 206 of the general-purpose numerical key unit 200, only a corresponding key is input table. In the case where during execution of the cassette selecting mode, numerical value input keys (hardware keys) of 3 to 9 which are not used in the cassette selecting mode are in an ON state, the controller 30 does not display on the software key that the hardware key is in the ON state. That is, the controller 30 does not change the display of the corresponding software key in the case where the hardware numerical key which is not used in the cassette selecting mode is pushed down.

For this reason, in the step S6, depending on the input mode at that time, the controller 30 discriminates whether or not the corresponding software key is in an inputtable state. In the case where the controller 30 discriminated that the corresponding software key is in the inputtable state (YES of step S6), the controller 30 provides an instruction to reverse a display color of the corresponding software key (step S7). By this instruction, the ON/OFF display mode is started. The controller 30 renews the display image information on the RAM 32, and renews the display screen on the panel surface 57 (step S8). Thereafter, the controller 30 executes an operation based on the inputted key code (step S9), and ends the processing. In this embodiment, description is omitted, but in the case where the controller 30 detected that the hardware key is pushed down, the controller 30 renewed the display image on the panel surface 57 so as to change the display of the corresponding software key, but in the case where the pushing-down of the hardware key is released, the controller 30 renews the display image on the panel surface 57 so as to return the display of the corresponding software key to a state before the change.

On the other hand, in the step S6, in the case where the controller 30 discriminated that the corresponding software key is not in the inputtable state (NO of step S6), although the software key having the key code identical to the inputted hardware key is during display, but is in an input disable state. In this case, the controller 30 ends the processing as it is without providing an instruction to reverse the display color of the corresponding software key. This is because when the display of the software key is reversed in interrelation with the inputted hardware key of the numerical key portion 206, the user is caused to have misunderstanding that the operation is received. In the case where the software key is in the input disabled state, the state is a state in which execution of a function corresponding to the key is divided, and therefore, processing to key input is ended without performing any processing. At this time, the controller 30 causes the panel surface 57 to display to the effect that execution of the operation to the input is disabled, and notifies the user of that effect.

Further, in the step S5, in the case where the controller 30 discriminated that the software key having the key code identical to the inputted hardware key is not during the display (NO of step S5), the software key for reversing the display color is not displayed. For this reason, the controller 30 executes an operation based on the inputted key code (step S9), and ends the processing.

As described above, according to the image forming apparatus 1 of this embodiment, in the case where the general-purpose numerical key unit 200 is connected to the USB port 12, a predetermined software key corresponding to a predetermined hardware key of the numerical key portion 206 is displayed on the panel surface 57. Then, the controller 30 executes the ON/OFF display mode in which the ON/OFF state of the predetermined hardware key is displayed at the predetermined software key. By this, the user is capable of checking the ON/OFF state of the operated numerical key portion 206 by looking at the software numerical key portion 58 adjacent thereto just on the left side L while operating the general-purpose numerical key unit 200. For this reason, the user is capable of checking the ON/OFF state of the operated numerical key portion 206 without largely moving his (her) eyes, so that an operating property when the input to the externally attached general-purpose numerical key unit 200 is made can be improved.

Further, according to the image forming apparatus 1 of this embodiment, the software key of which ON/OFF state is displayed on the panel surface 57 corresponds to the hardware key of the numerical key portion 206. For this reason, in the case where a use frequency in the operation keys 205 is high, and for example, high input efficiency is required in input of a facsimile number or the like, the operating property can be effectively improved.

Further, according to the image forming apparatus 1 of this embodiment, in the case where the ON/OFF state of the predetermined hardware key is switched, the controller 30 reverses and displays the character color and the background color of the predetermined software key on the panel surface 57. For this reason, viewability is high, and therefore, the user is capable of easily recognizing the operated key without directly looking at the hardware key.

Further, according to the image forming apparatus 1 of this embodiment, on the panel surface 57, the controller 30 does not display the ON/OFF state of the predetermined hardware key, which is not used, during execution of a predetermined input mode, for example the cassette selecting mode of the input modes. By this, it is possible to prevent that even the software key corresponding to the hardware key which is not used is provided and is erroneously recognized by the user.

OTHER EMBODIMENTS

Figure 6:
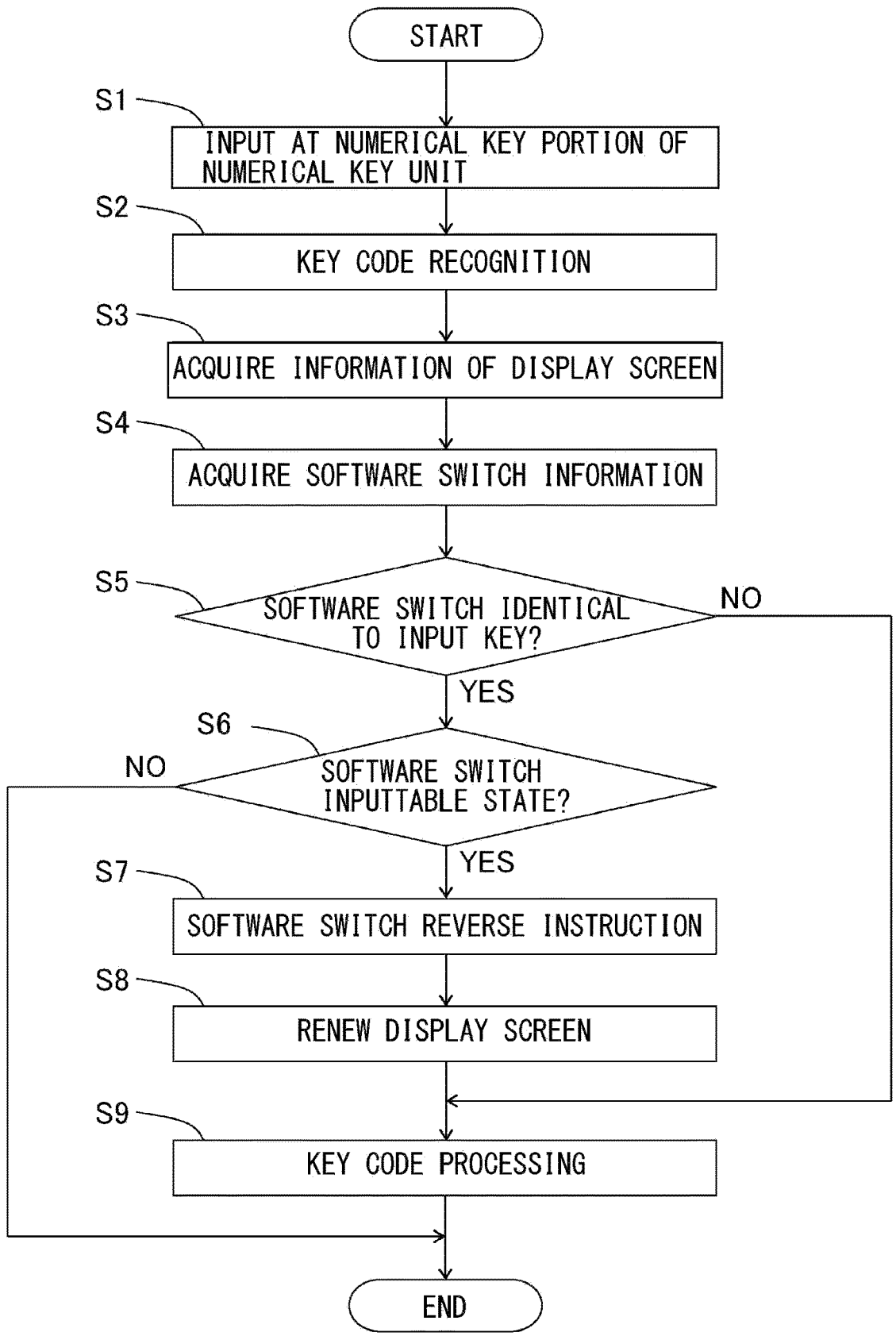
FIG. 6 is a flowchart showing a processing procedure of an ON/OFF display mode in the image forming apparatus according to the embodiment.

In the above-described embodiment, when the controller 30 detects the operation to the hardware key of the numerical key portion 206 by the user as shown in FIG. 6 (step S1), the controller 30 acquires display screen information from the RAM 32 for comparison with the software numerical key portion 58 (step S3). However, the present invention is not limited to this, but the ON/OFF display mode may also be prevented from being executed. A processing procedure in that case will be described along a flowchart shown in FIG. 7. Incidentally, in the flowchart shown in FIG. 7, steps S1 to S2 and S3 to S9 are similar processes as those in the flowchart shown in FIG. 6, and reference numerals or symbols are made the same and the steps will be omitted from detailed description.

Figure 7:
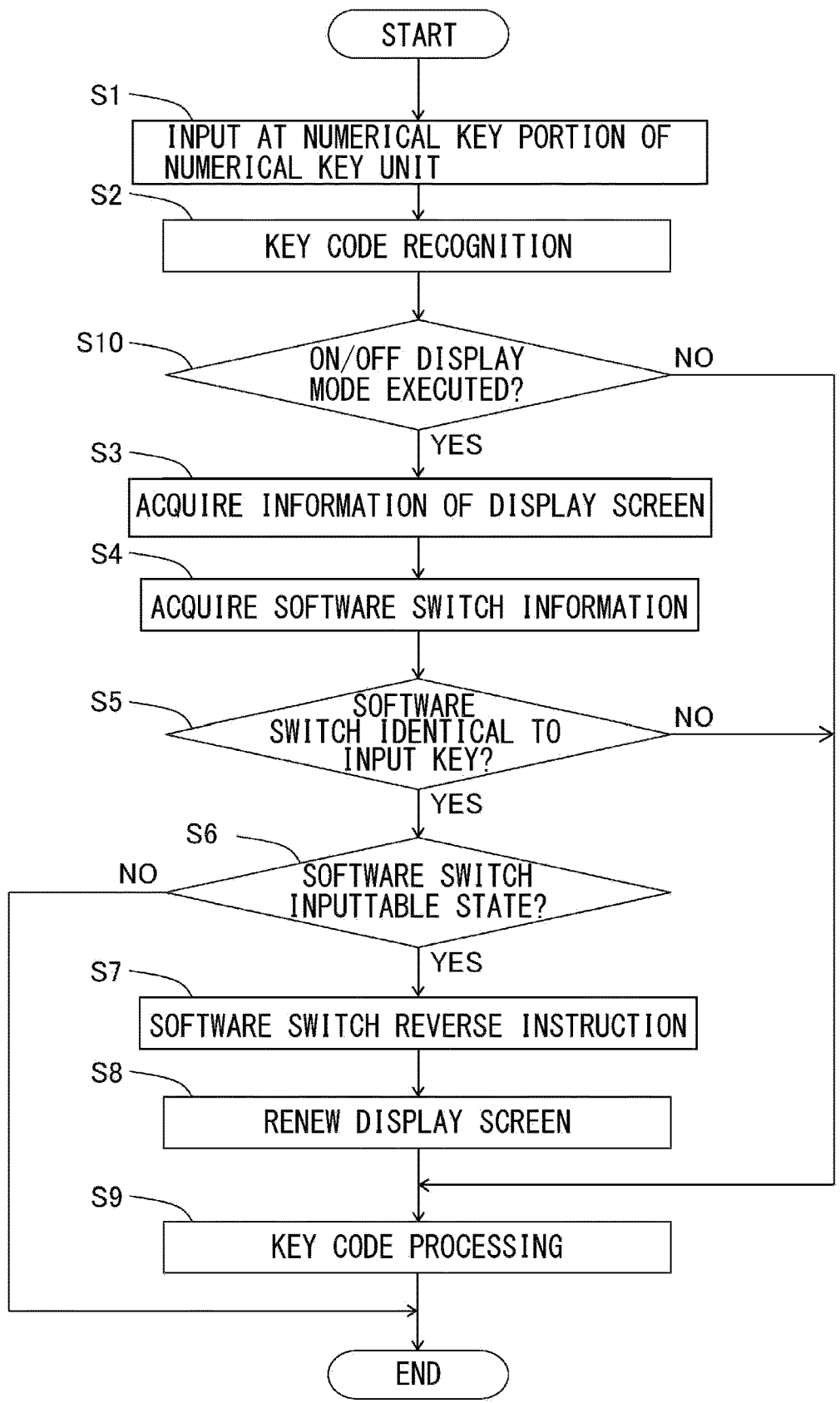
FIG. 7 is a flowchart showing a modified example of the processing procedure of the ON/OFF display mode in the image forming apparatus according to the embodiment.

As shown in FIG. 7, when the controller 30 detects the operation to the hardware key of the numerical key portion 206 of the general-purpose numerical key unit 200 by the user (step S1), the controller 30 recognizes the key code for discriminating the inputted hardware key (step S2). The controller 30 discriminates whether or not the ON/OFF display mode should be executed (step S10). The user records, whether or not the ON/OFF display mode should be executed, in advance in either of, the ROM 33, the RAM 32, the HDD 34, and the like, for example. The controller 3 discriminates whether or not the ON/OFF display mode should be executed, by checking a storing area of the ROM 33, the RAM 32, the HDD 34, or the like. In the case where the controller 30 discriminates that the ON/OFF display mode should not be executed (NO of step S10), for input of the numerical key portion 206, the controller 30 does not perform interrelation with the display of the software key. Thereafter, the controller 30 executes the operation based on the inputted key code (step S9), and ends the processing.

In the case where the controller 30 discriminated that the ON/OFF display mode should be executed (YES of step S10), for comparison with the software numerical key portion 58, the controller 30 acquires display screen information from the RAM 32 (step S3). A processing procedure subsequent to the step S3 is processes similar to those in the flowchart shown in FIG. 6. According to this embodiment, the ON/OFF display mode can be turned off, so that a range of user customization can be broadened.

Figure 8:
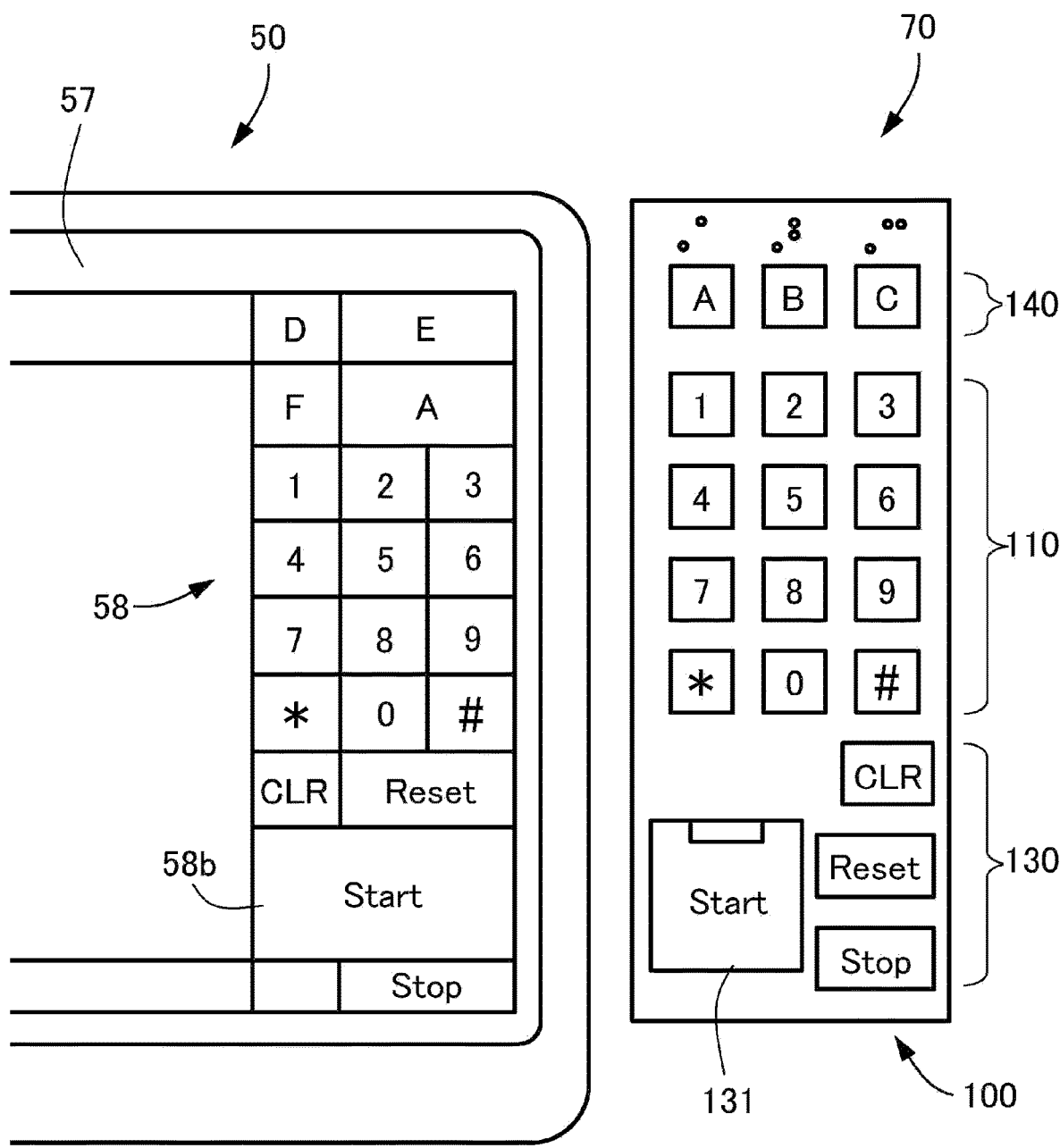
FIG. 8 is a plan view showing a dedicated numerical key unit and a part of an operating portion in the image forming apparatus according to the embodiment.

Further, in the above-described embodiment, the case where the general-purpose numerical key unit 200 is applied as the numerical key unit was described, but the present invention is not limited to this, and for example, the dedicated numerical key unit 70 may also be applied. Here, the case where the dedicated numeric key unit 70 was applied will be described using FIG. 8. FIG. 8 illustrates the dedicated numerical key unit 70 as viewed from the front side and is a diagram of the numerical key unit 70 viewed from a direction parallel to a pushing (pressing)-down direction of each of the hardware keys. Incidentally, the front side view is a position where the numerical values provided on the hardware keys of the dedicated numerical key unit 70 are properly seen in the up-down direction.

This dedicated numerical key unit 70 not only includes a plurality of hardware keys but also is mounted on the image forming apparatus 1 including the operating portion 50 to which the information is capable of being inputted, and is capable is inputting information to the controller 30 of the image forming apparatus 1, separately from the operating portion 50. As an example of different uses for different purposes in information input between the operating portion 50 and the dedicated numerical key unit 70, setting of a density, a size, and the like relating to image formation is inputted from the operating portion 50, and numerical values such as the number of sheets subjected to the image formation and a designation number of a facsimile and the like are inputted from the dedicated numerical key unit 70.

Operation keys (plurality of hardware keys) 100 of the dedicated numerical key unit 70 roughly includes, as hardware keys, a numerical key portion (numerical value key portion) 110, an operation key portion 130, and the setting key portion 140.

The numerical key portion 110 includes a plurality of hardware keys capable of inputting information on at least numerical values, and is capable of inputting the number of sheets subjected to copying and the telephone number of the facsimile, or the like. The operation key portion 130 includes a start key 131, a stop key, a reset key, and a clear key, and either of these keys are disposed on the front side F of the numerical key portion 110 and are capable of inputting information on predetermined processing. Here, the start key 131 is a hardware key capable of inputting information for providing a start of execution of the predetermined processing such as copying processing of the image forming apparatus 1, transmission processing of the facsimile, image reading processing of the image reading portion 20, and the like. Further, the stop key is a hardware key capable of inputting an instruction to stop the predetermined processing started in response to pushing-down of the start key 131. Further, the reset key is a hardware key capable of inputting information for resetting setting inputted to the image forming apparatus 1, and the clear key is a hardware key capable of inputting information for clearing numerical data inputted via the numerical key portion 110. The setting key portion 140 includes three keys of first to third setting keys in this embodiment, and is capable of setting a mode and a function of the image forming apparatus 1, which are determined in advance. Here, the mode determined in advance is a voice input mode capable of inputting information to the image forming apparatus 1 by voice, or the like mode.

In this case, in the case where an ON/OFF state of, for example, the start key 131 is switched in the panel surface 57 of the operating portion 50, the controller 30 reverses and displays the character color and the background color of a "start" key 58*b* of the software numerical key portion 58. That is, the controller 30 reverses and displays the character color and the background color of the "start" key 58*b* in the case where the start key 131 is pushed down, and returns the character color and the background color of the "start" key 58*b* to a state (state before the pushing-down of the start key 131) before the reversed in the case where pushing-down of the start key 131 is released. Incidentally, in this embodiment, switching of the display information of the panel surface 57 in the case where the start key 131 is pushed down was described, but also, regarding the case where another key of the operation key 130, the setting key 140, or the numerical key portion 110 is pushed down, an image of the panel surface 57 is renewed so as to switch the display of the corresponding software key (so as to reverse the character color and the background color). Thus, also in this embodiment, even in the case where the hardware key of the dedicated numerical key unit 70 is operated, the display screen of the panel surface 57 is renewed so as to become identical to the display in the case where the software key of the panel surface 57 is touch-operated. For this reason, viewability of the user is enhanced, so that even when the user does not directly look at the hardware key, the user is capable of easily recognize the pushed key.

Here, the dedicated numerical key unit 70 in this embodiment is a dedicated numerical key unit designed, for the image forming apparatus 1, as one of option devices of the image forming apparatus 1. Uses of this dedicated numerical key unit 70 are principally, for example, input of a designation number (FAX number) during facsimile transmission. The dedicated numerical key unit 70 is designed for principal purpose of inputting the designation number of the facsimile transmission, and therefore, an arrangement of the numerical key portion 110 is similar to an arrangement of a telephone. That is, the arrangement of the numerical key portion 110 of the dedicated numerical key unit 70 is similar to a standard arrangement shown in Recommendation E.161 of ITU-T (International Telecommunication Union-Telecommunication Standardization Sector). That is, as shown in FIG. 8, in the numerical key portion 110, the numerical keys from 1 to 9 are adjacently disposed so that a rearmost side B includes 1 to 3, the front side F thereof includes 4 to 6 and a further front side F thereof includes 7 to 9. Further, on the front side F of the numerical key of 8, the numerical key of 0 is disposed, and the "*" key and the "#" key are disposed on left and right sides thereof (of the "0" key). In other words, with respect to the 10 hardware keys from 0 to 9, a row of the numerical keys of 1, 2 and 3 is disposed on the rearmost side, and a row of the numerical keys of 4, 5 and 6 is disposed on a side in front of the row of 1, 2 and 3. Further, a row of the numerical keys of 7, 8 and 9 is disposed on a side in front of the row of the numerical keys 4, 5 and 6. Further, the hardware key of 0 is disposed on a side in front of the row of the hardware keys of 7, 8 and 9. Further, when these numerical keys from 0 to 9 are viewed in column, from a left(-hand) side, these numerical keys are arranged in the order of a column of the numerical keys 1, 4 and 7, a column of the hardware keys 2, 5, 8 and 0, and a column of the numerical keys 3, 6 and 9. That is, the dedicated numerical keys of 1 to 9 are aligned and arranged in a matrix of 3×3 in the case where the numerical key unit 70 is viewed from the front side, so that from an upper stage in a column direction, the numerical keys of 1 to 3, the numerical keys of 4 to 6, and the numerical keys of 7 to 9 are sequentially disposed and so that the numerical key of 0 is disposed on a further lower stage than the row of the numerical keys of 7 to 9. Incidentally, the numerical key of 0 may also be disposed in the column of the numerical keys of 1, 4 and 7 or in the column of the hardware keys of 3, 6 and 9, and the arrangement of the "*" key and the "#" key may appropriately be changed. Further, in this dedicated numerical key unit 70, electronic calculator input is not a principal purpose, and therefore, four arithmetic operators such as +, −, ×, /, and the like are not provided. Thus, this dedicated numerical key unit 70 is not designed for the purpose of being connected to a PC, and therefore, is different in key arrangement from a general-purpose numerical key unit connectable to unspecified PCs and so on.

Further, in the above-described embodiment, the case where the numerical key unit 200 is applied as the input device was described, but the present invention is not limited to this, and for example, an input device, such as a full keyboard, corresponding to character input other than the numerical values may also be applied.

INDUSTRIAL APPLICABILITY

According to the present invention, the input device and the image forming apparatus capable of improving the operating property when the numerical value input is made from the input device in the case where the input device for external attachment is connected to the image forming apparatus is provided.

The present invention is not restricted to the foregoing embodiment, but can be variously changed and modified without departing from the spirit and the scope of the present invention. Accordingly, the following claims are attached hereto to make public the scope of the present invention.

This application claims the Conventional Priority from Japanese Patent Application 2019-018765 filed Feb. 5, 2019, all disclosure of which is incorporated by reference herein.

The invention claimed is:

1. An image forming apparatus comprising:
an image reading device configured to read an image of an original;
an image forming portion configured to form the image on a recording medium on the basis of a result of said image reading device;
an operating panel including a display screen capable of displaying a plurality of software numerical keys, as software keys, to input numerical information of 0 to 9, respectively;
an input device including a plurality of hardware numerical keys, as hardware keys capable of inputting numerical information of 0 to 9 respectively by being pushed down; and
a controller configured to control said display screen so as to change a display state of the plurality of software numerical keys,
wherein, in response to pushing down of a hardware numerical key included in the plurality of hardware numerical keys of said input device, said controller controls said display screen so that a display state of the software numerical key corresponding to a numerical value identical to the hardware numerical key pushed down changes.

2. An image forming apparatus according to claim 1, wherein the software numerical key includes a character portion and a background portion around the character portion, and
wherein in response to the pushing-down of the hardware numerical key, said controller changes and displays a color of the background portion of the software numerical key corresponding to a numerical key identical to the hardware numerical key pushed down.

3. An image forming apparatus according to claim 2, wherein in response to the pushing-down of the hardware numerical key, said controller changes and displays a color of the character portion of the software numerical key corresponding to the numerical key identical to the hardware numerical key pushed down.

4. An image forming apparatus according to claim 3, wherein in response to the pushing-down of the hardware numerical key, said controller reverses and displays a color of the character portion and a color of the background portion of the software numerical key corresponding to the numerical key identical to the hardware numerical key pushed down.

5. An image forming apparatus according to claim 1, wherein said operating panel is capable of displaying a software execution key, as a software key, to provide an instruction of a start of image reading to said image reading device, on said display screen,
wherein said input device includes a hardware execution key, as a numerical key capable of providing a start of image reading to said image reading device by being pushed down, and
wherein said controller controls said display screen so that a display state of the software execution key in response to pushing-down of the hardware execution key of said input device changes and so that the changed display state of the software execution value is returned to a display state before the pushing-down of the hardware execution key in response to release of the pushing-down of the hardware execution key.

6. An image forming apparatus according to claim 5, wherein the software execution key can display includes a character portion and a background portion around the character portion, and
wherein in response to the pushing-down of the hardware execution key, said controller changes and displays a color of the background portion of the software execution key.

7. An image forming apparatus according to claim 6, wherein in response to the pushing-down of the hardware execution key, said controller changes and displays a color of the character portion of the software execution key.

8. An image forming apparatus according to claim 7, wherein in response to the pushing-down of the hardware execution key, said controller reverses and displays a color of the character portion and a color of the background portion of the software execution key.

9. An image forming apparatus according to claim 1, wherein said input device is capable of executing a first input mode to input information on numerical values by the plurality of hardware numerical keys and a second input mode in which usable numerical value information is more restricted than in the first input mode, in a switching manner, and
wherein in a case that the second input mode is executed, said panel portion switches display of the software numerical key corresponding to the hardware numerical key in a case that the hardware numerical key, of said plurality of hardware numerical keys, of which use is not restricted in the second input mode is pushed down, and does not switch display of the software numerical key corresponding to the hardware numerical key in a case that the hardware numerical key of which use is restricted in the second input mode is pushed down.

10. An image forming apparatus according to claim 9, comprising a plurality of sheet cassettes configured to accommodating sheets fed to said image forming portion,
wherein the second input mode is a cassette selecting mode in which, of said plurality of sheet cassettes, the sheet cassette being configured to feed the sheet to said image forming portion is selected, and
wherein the numerical key of which use is restricted in the second input mode is a numerical key to input a numerical value larger than a number of said plurality of sheet cassettes.

11. An image forming apparatus according to claim 1, wherein an arrangement of numerical keys of 0 to 9 of said plurality of hardware keys is identical to an arrangement of numerical key of 0 to 9 of said plurality of software keys.

12. An image forming apparatus according to claim 11, wherein the numerical keys of 0 to 9 are disposed so that 7 is positioned on a lower side than 1 is in a case that the numerical keys are viewed from a pushing-down direction.

13. An image forming apparatus according to claim 1, wherein said operating panel is provided on a right side of a center of said image forming apparatus with respect to a left-right direction of said image forming apparatus, and
wherein said input device is provided on a right side of said operating panel with respect to the left-right direction.

14. An image forming apparatus according to claim 1, further comprising a discharging portion configured to discharge the recording medium on which the image is formed by said image forming portion,
wherein said operating panel is provided above said discharging portion with respect to a vertical direction.

15. An image forming apparatus according to claim 1, wherein said controller controls said display screen so that said changed display state of the software numerical value is returned to a display state before the pushing down of the hardware numerical key in response to release of the pushing down of the hardware numerical key.

* * * * *